United States Patent
Kim et al.

(10) Patent No.: US 9,853,783 B2
(45) Date of Patent: Dec. 26, 2017

(54) METHOD AND APPARATUS FOR TRANSMITTING AND RECEIVING SIGNAL IN DISTRIBUTED ANTENNA SYSTEM

(71) Applicant: Samsung Electronics Co., Ltd., Gyeonggi-do (KR)

(72) Inventors: Youn-Sun Kim, Gyeonggi-do (KR); Hyo-Jin Lee, Gyeonggi-do (KR); Joon-Young Cho, Gyeonggi-do (KR); Ki-il Kim, Gyeonggi-do (KR); Ju-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1129 days.

(21) Appl. No.: 13/631,004

(22) Filed: Sep. 28, 2012

(65) Prior Publication Data

US 2013/0083752 A1    Apr. 4, 2013

(30) Foreign Application Priority Data

Sep. 30, 2011 (KR) .................. 10-2011-0100162
Oct. 7, 2011 (KR) .................. 10-2011-0102690

(Continued)

(51) Int. Cl.
*H04L 5/00* (2006.01)
*H04L 1/02* (2006.01)
(Continued)

(52) U.S. Cl.
CPC .............. *H04L 5/0048* (2013.01); *H04L 1/02* (2013.01); *H04L 25/0224* (2013.01); *H04B 7/024* (2013.01)

(58) Field of Classification Search
CPC ....... H04B 7/024; H04L 1/02; H04L 25/0204; H04L 25/0224; H04L 5/0048
See application file for complete search history.

(56) References Cited

U.S. PATENT DOCUMENTS 6,542,484 B1 * 4/2003 Ovesjo et al. ............... 370/335
2010/0195748 A1 8/2010 Nam et al.
(Continued)

FOREIGN PATENT DOCUMENTS

| CN | 1308824 | 8/2001 |
| CN | 102055519 | 5/2011 |

(Continued)

OTHER PUBLICATIONS

NTT DOCOMO, "DL Control Channel Enhancement for DL MIMO in Rel-11", R1-111636, 3GPP TSG RAN WG1 Meeting #65, May 9, 2011.

(Continued)

*Primary Examiner* — Noel Beharry
*Assistant Examiner* — Rodrick Mak
(74) *Attorney, Agent, or Firm* — The Farrell Law Firm, P.C.

(57) ABSTRACT

An apparatus and method for transmitting and receiving a signal in a Distributed Antenna System (DAS) is provided. A method for determining an initial state in a DAS includes receiving a value through high-level signalling and determining an initial state based on the value, in which the value includes a value in which is set an initial state of a scrambling sequence, which differs according to a transmission point.

6 Claims, 7 Drawing Sheets

(30) Foreign Application Priority Data

Nov. 2, 2011 (KR) .................. 10-2011-0113611
Nov. 17, 2011 (KR) .................. 10-2011-0120072

(51) Int. Cl.
*H04L 25/02* (2006.01)
*H04B 7/024* (2017.01)

(56) References Cited

U.S. PATENT DOCUMENTS

| | | |
|---|---|---|
| 2011/0038310 A1 | 2/2011 | Chmiel et al. |
| 2011/0044159 A1 | 2/2011 | Kishiyama et al. |
| 2011/0077038 A1 | 3/2011 | Montojo et al. |
| 2011/0085503 A1 | 4/2011 | Nam et al. |
| 2011/0206157 A1 | 8/2011 | Xu et al. |
| 2011/0237283 A1 | 9/2011 | Shan et al. |
| 2011/0310818 A1* | 12/2011 | Lin ............. H04W 72/042 370/329 |
| 2012/0033571 A1 | 2/2012 | Shimezawa et al. |
| 2012/0039298 A1 | 2/2012 | Lee et al. |
| 2012/0176884 A1* | 7/2012 | Zhang ............. H04B 7/024 370/203 |
| 2012/0177007 A1 | 7/2012 | Kagimoto et al. |
| 2012/0282936 A1* | 11/2012 | Gao ............. H04L 5/0023 455/450 |
| 2012/0287875 A1* | 11/2012 | Kim et al. ............. 370/329 |
| 2012/0307768 A1 | 12/2012 | Xu et al. |
| 2013/0003663 A1* | 1/2013 | Blankenship et al. ........ 370/329 |
| 2013/0022087 A1 | 1/2013 | Chen et al. |
| 2013/0182594 A1* | 7/2013 | Kim ............. H04W 72/042 370/252 |
| 2013/0301467 A1* | 11/2013 | Kang et al. ............. 370/252 |
| 2014/0192672 A1* | 7/2014 | Seo ............. H04W 24/10 370/252 |

FOREIGN PATENT DOCUMENTS

| | | |
|---|---|---|
| CN | 102055689 | 5/2011 |
| CN | 102082595 | 6/2011 |
| CN | 102149082 | 8/2011 |
| CN | 102170624 | 8/2011 |
| CN | 102202027 | 9/2011 |
| JP | 2003-016738 | 1/2003 |
| JP | 2010-074553 | 4/2010 |
| RU | 2010106968 | 9/2011 |
| WO | WO 99/60809 | 11/1999 |
| WO | WO 2009/158519 | 12/2009 |
| WO | WO 2010/122818 | 10/2010 |
| WO | WO 2010/123287 | 10/2010 |
| WO | WO 2011/062066 | 5/2011 |
| WO | WO 2011/099811 | 8/2011 |
| WO | WO 2012/094635 | 7/2012 |

OTHER PUBLICATIONS

Renesas Mobile Europe Ltd., "CSI Feedback Enhancements", R1-112314, 3GPP TSG-RAN WG1 Meeting #66, Aug. 22, 2011.
ETSI, Universal Mobile Telecommunications System (UMTS); UMTS Terrestrial Radio Access (UTRA); Concept Evaluation (UMTS 30.06 Version 3.0.0) TR 101 146 V3.0.0, Dec. 1997.
Australian Examination Report dated Apr. 19, 2016 issued in counterpart application No. 2012316918, 6 pages.
Chinese Office Action dated May 23, 2016 issued in counterpart application No. 201280058009.7, 13 pages.
Japanese Office Action dated Jun. 20, 2016 issued in counterpart application No. 2014-533220, 4 pages.
Russian Office Action dated Jun. 1, 2016 issued in counterpart application No. 2014117706/07, 11 pages.
European Search Report dated Jul. 29, 2016 issued in counterpart application No. 12186653.7-1874, 6 pages.
Japanese Office Action dated Oct. 17, 2016 issued in counterpart application No. 2014-533220, 6 pages.

* cited by examiner

METHOD AND APPARATUS FOR TRANSMITTING AND RECEIVING SIGNAL IN DISTRIBUTED ANTENNA SYSTEM

PRIORITY

This application claims priority under 35 U.S.C. §119(a) to Korean Patent Applications filed in the Korean Intellectual Property Office on Sep. 30, 2011 and assigned Serial No. 10-2011-0100162, on Oct. 7, 2011 and assigned Serial No. 10-2011-0102690, on Nov. 2, 2011 and assigned Serial No. 10-2011-0113611, and on Nov. 17, 2011 and assigned Serial No. 10-2011-0120072, the contents of each of which are hereby incorporated by reference.

BACKGROUND OF THE INVENTION

1. Field of the Invention

The present invention relates generally to a wireless mobile communication system, and more particularly, to an apparatus and method for transmitting and receiving a signal in a Distributed Antenna System (DAS).

2. Description of the Related Art

Generally, a cellular wireless mobile communication system is constructed by establishing a plurality of cells in a limited region. Base Station (BS) components in charge of mobile communication in each cell are located in the center of the cell The BS components, may be an antenna for transmitting a wireless signal or a signal processing part, and provide a mobile communication service to User Equipments (UEs) within the cell in the center of the cell. As such, a system in which the antenna is installed in the center of the cell is called a Centralized Antenna System (CAS), and a general mobile communication system is an example of such a system.

There also exists a Distributed Antenna System (DAS), which is different from the CAS.

However, the conventional DAS needs a scheme capable of providing an improved mobile communication service by evenly distributing antennas over a service coverage area of the cell, when compared to the CAS.

SUMMARY OF THE INVENTION

Accordingly, the present invention provides a method for determining an initial state for generating a scrambling sequence of a Demodulation Reference Signal (DMRS) for efficient communication in a DAS where antennas are disposed in a distributed manner over a service coverage area of each BS.

According to an aspect of the present invention, there is provided a method for determining an initial state in a DAS, the method including receiving a value through high-level signalling and determining an initial state based on the value, which indicates a value having a set initial state of a scrambling sequence, which differs according to a transmission point.

According to another aspect of the present invention, there is provided an apparatus for determining an initial state in a DAS, including a receiver for receiving a value through high-level signalling and a controller for determining an initial state based on the value, which includes another value having a initial state of a scrambling sequence, which differs according to a transmission point.

According to another aspect of the present invention, there is provided a method for determining an initial state in a DAS, including receiving a Scrambling Code Identification (SCID) and judging based on the received SCID whether a determined initial state is a legacy initial state or a new initial state.

According to another aspect of the present invention, there is provided an apparatus for determining an initial state in a DAS, including a receiver for receiving an SCID and a controller for judging based on the received SCID whether a determined initial state is a legacy initial state or a new initial state.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF THE EMBODIMENTS OF THE PRESENT INVENTION

Figure 1:
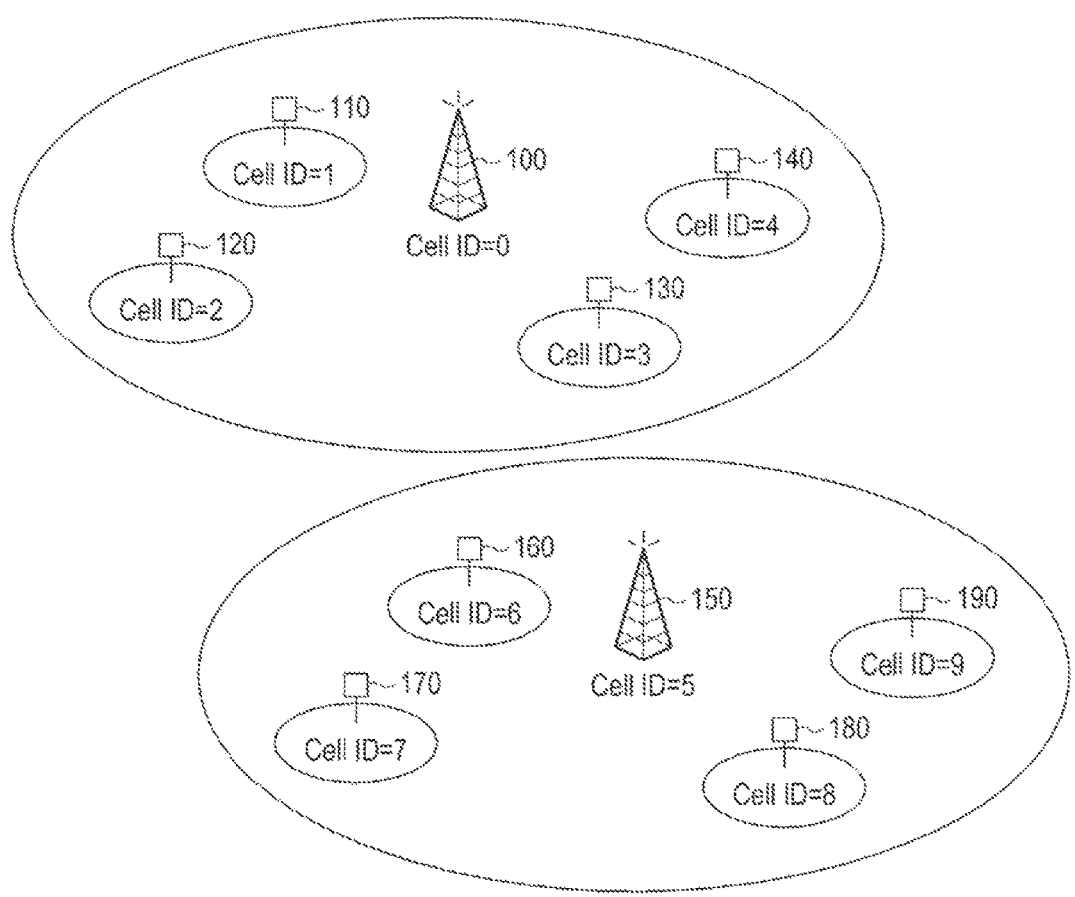
FIG. 1 illustrates a plurality of cells in a conventional system.

Hereinafter, embodiments of the present invention will be described in detail with reference to the accompanying drawings. Well-known functions and structures will not be described if they may unnecessarily obscure the subject matter of the present invention. Terms used herein are defined based on functions in the present invention and may vary according to users, operators' intention or usual practices. Therefore, the definition of the terms should be made based on contents throughout the specification.

A detailed description of the embodiments of the present invention will be made primarily based on a wireless communication system based on Orthogonal Frequency Division Multiplexing (OFDM), particularly, the 3$^{rd}$ Generation Partnership Project (3GPP) Enhanced Universal Terrestrial Radio Access (EUTRA) standard, but the subject matter of the present invention is applicable to other communication systems having similar technical backgrounds and channel forms, without largely departing from the scope of the present invention, as will be understood by those of ordinary skill in the art.

The present invention discloses, in a mobile communication system where a plurality of BSs are present, a method for performing interference measurement in a UE for efficient communication in a downlink in a DAS in which antennas operated by each BS are distributed over a service coverage area of the BS.

From an early stage of providing a voice-oriented communication service, a mobile communication system has now evolved into a high-speed and high-quality wireless packet data communication system to provide a data and multimedia service. Recently, various mobile communication standards such as High Speed Downlink Packet Access (HSDPA) of the 3GPP, High Speed Uplink Packet Access (HSUPA), LTE, LTE-A, High Rate Packet Data (HRPD) of the 3GPP2, and 802.16 of the Institution of Electrical and Electronics Engineers (IEEE), have been developed to support a high-speed and high-quality wireless packet data transmission service. In particular, the LTE system developed for efficiently supporting high-speed wireless packet data transmission maximizes wireless system capacity by using various wireless connection techniques. The LTE-A system, which evolved from the LTE system, has improved data transmission capability when compared to the LTE system.

The LTE generally refers to BS and UE components corresponding to Release 8 or 9 of the 3GPP standard organization, and LTE-A generally refers to BS and UE components corresponding to Release 10 of the 3GPP standard organization. The 3GPP standard organization has standardized the LTE-A system and is now developing a standardization of a subsequent Release having improved performance based on the standardized LTE-A system.

Existing $3^{rd}$-Generation and $4^{th}$-Generation wireless packet data communication systems such as HSDPA, HSUPA, HRPD, LTE/LTE-A, use an Adaptive Modulation and Coding (AMC) scheme and a channel-sensitive scheduling scheme to improve transmission efficiency. When using the AMC scheme, a transmitter may adjust the amount of data to be transmitted according to a channel state. That is, when a channel state is poor, the transmitter reduces the amount of data to be transmitted to match a reception error probability to a desired level. When a channel state is good, the transmitter increases the amount of data to be transmitted to match a reception error probability to a desired level and efficiently transmit much information. When using the channel-sensitive scheduling resource management scheme, because the transmitter selectively provides a service to a user having an excellent channel state among a plurality of users, system capacity is increased compared to when the transmitter provides a service after allotting a channel to a user. Such capacity increase is commonly referred to as a multi-user diversity gain. The AMC scheme and the channel-sensitive scheduling scheme are for receiving partial channel state information being fed back from a receiver, and applying an appropriate modulation and coding technique at the most efficient time.

The AMC scheme, when used together with a Multiple Input Multiple Output (MIMO) transmission scheme, may determine the number of spatial layers or ranks of a transmission signal. The AMC scheme also determines an optimal data rate and considers the number of layers for transmission using MIMO as well as a code rate and a modulation scheme.

Extensive research is being conducted to replace CDMA, which is the multiple access scheme used the $2^{nd}$-Generation and $3^{rd}$-Generation mobile communication systems, with OFDMA in the next generation mobile communication system. 3GPP and 3GPP2 have started standardization work on evolved systems based on OFDMA. It is expected that OFDMA, compared to CDMA, will increase capacity, because frequency domain scheduling can be performed on a frequency axis. While capacity gain can be obtained from the time-varying channel characteristic using the channel-sensitive scheduling method, more capacity gain can be obtained using the frequency-varying channel characteristic.

Generally, a mobile communication network composed of a plurality of cells is established to expand a system capacity in a mobile communication system. The size of each cell is determined according to a transmission power of the cell.

FIG. 1 illustrates a plurality of cells disposed in a conventional system.

In FIG. 1, a transmission point 100 which performs transmission with high transmit power forms a cell having a large area, and 110, 120, 130, and 140 which perform transmission with low transmit power form cells having small areas in the cell region of 100. In FIG. 1, transmission points 100, 110, 120, 130, and 140 transmit and receive wireless signals by using a single antenna or a plurality of antennas in their locations, thereby providing a mobile communication service to UEs in their respective cells. A transmission point 150 which performs transmission with high transmit power forms another cell having a large area, and 160, 170, 180, and 190 which perform transmission with low transmit power form cells having small areas in the cell region of 150. The cells formed by transmission points 100, 110 120, 130, 140, 150, 160, 170, 180, and 190, respectively, have unique cell IDs. The cell ID is a value allocated to each cell to allow a UE to identify the cell, and 500 or more cell IDs are supported in an LTE/LTE-A system.

In FIG. 1, signals transmitted by respective cells may be transmitted differently using corresponding cell IDs. In particular, with respect to a Demodulation Reference Signal (DMRS) for a PDSCH of a downlink used for a UE to perform channel estimation in an LTE-A system, a scrambling sequence applied for randomization of the signal is applied differently according to a cell ID. The DMRS for the PDSCH (or a PDSCH DMRS) is a reference signal transmitted by an eNB to a UE to enable channel estimation for performing channel reconstruction for the PDSCH.

Figure 2:
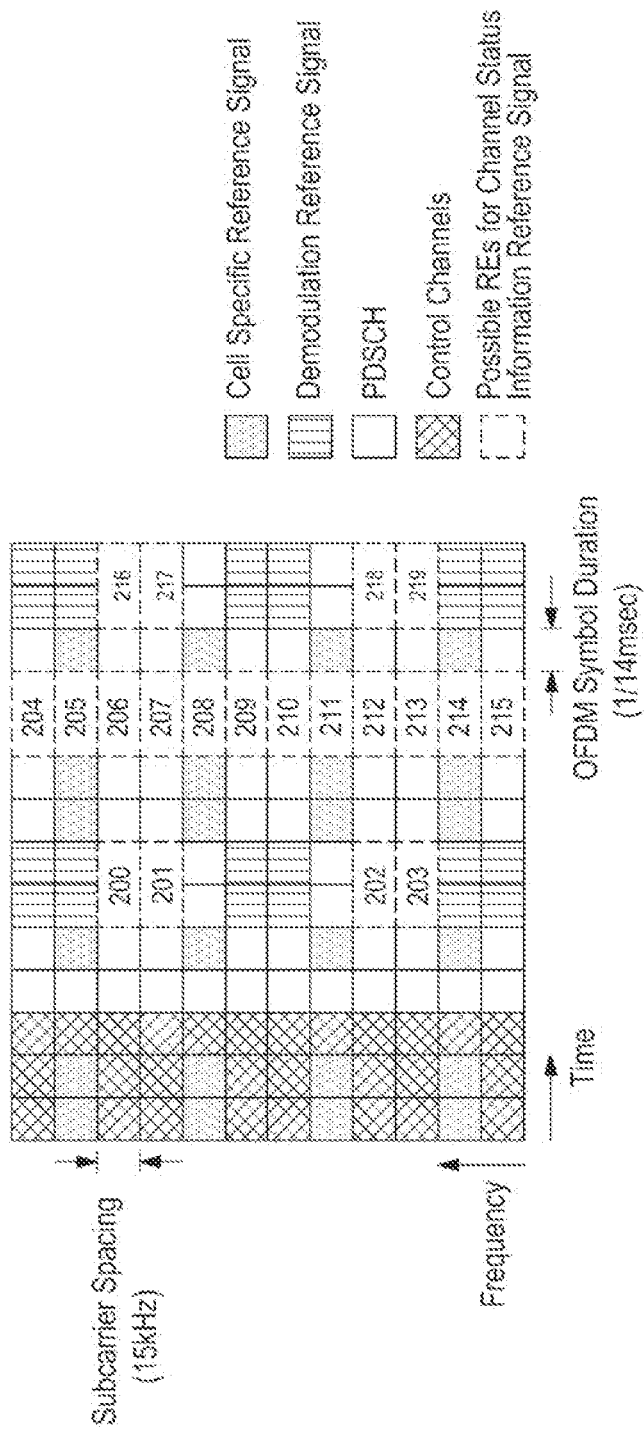
FIG. 2 illustrates a downlink Resource Block (RB) of a Long Term Evolution-Advanced (LTE-A) system.

In the LTE-A system, a signal is transmitted using an OFDMA scheme. A bandwidth for signal transmission in the LTE-A system is divided into a plurality of Resource Blocks (RBs), and a UE may receive a traffic signal through one or more RBs. FIG. 2 illustrates downlink RBs of the LTE-A system. One RB is composed of 12 subcarriers in a frequency domain, and is composed of 14 OFDM symbols on a time axis. A frequency and time resource in a minimum unit which may carry data in one RB is referred to as a Resource Element (RE), and the RB is composed of 168 (12 subcarriers×14 OFDM symbols) REs.

Signals performing different functions are transmitted in one RB, as well as a Cell-specific Reference Signal (CRS), a Demodulation Reference Signal (DMRS), a Physical Downlink Shared Channel (PDSCH), and control channels, as shown in FIG. 2. In addition, a Channel Status Information Reference Signal (CSI-RS) may be transmitted in positions 200-219 of FIG. 2. The CSI-RS may be transmitted in one or more of the positions 200-219, and the PDSCH is not transmitted in positions in which the CSI-RS is transmitted, but the PDSCH may be transmitted instead in positions that are not set for the CSI-RS among the positions 200-219.

Figure 3:
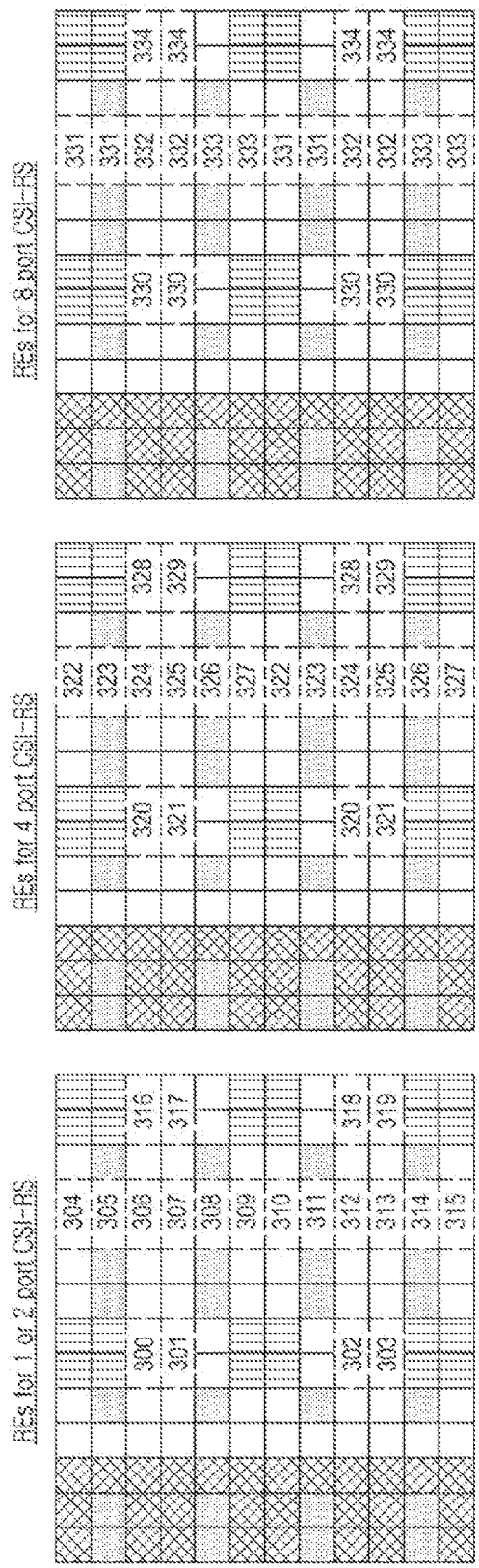
FIG. 3 illustrates Resource Elements (REs) in which a 1 port Channel Status Information Reference Signal (CSI-RS), a 2 port CSI-RS, a 4 port CSI-RS, and an 8 port CSI-RS are transmitted.

FIG. 3 illustrates Resource Elements (REs) in which a 1 port Channel Status Information Reference Signal (CSI-RS), a 2 port CSI-RS, a 4 port CSI-RS, and an 8 port CSI-RS are transmitted. It can be seen from FIG. 3 that a 1 port CSI-RS and a 2 port CSI-RS have sub-pattern characteristics in which transmission positions thereof are included in a transmission position of a 4 port CSI-RS. The 4 port CSI-RS has a sub-pattern characteristic in which the transmission position thereof is included in a transmission position of an 8 port CSI-RS. For example, a transmission position 320 in which one 4 port CSI-RS can be transmitted is included in a transmission position 330 in which one 8 port CSI-RS can be transmitted.

When a plurality of cells having different cell IDs exist as shown in FIG. 1, different scrambling is applied to PDSCH DMRSs of FIG. 2 according to cell IDs. By applying different scrambling, interference generated between PDSCH DMRSs transmitted from the different cells is effectively randomized, thus improving channel estimation performance. More specifically, scrambling sequences applied to respective cells are generated using an initial state given by Equation (1), in which:

$$C_{init}=(\lfloor n_s/2 \rfloor+1)\cdot(2N_{ID}^{cell}+1)\cdot 2^{16}+n_{SCID} \quad (1)$$

Generally, a scrambling sequence is generated according to a generator polynomial, and a value thereof varies according to an initial state that is set in generation of the scrambling sequence. In Equation (1), $N_{ID}^{cell}$ represents a cell ID and has a variable value according to the cell ID. Therefore, cells having different cell IDs have different initial states, such that the PDSCH DMRSs may be scrambled by different scrambling sequences.

The function of performing scrambling in different cells in the LTE-A system as described above has a limitation in randomization of interference when a DAS, which is an advanced mobile communication system, is established. This is because in the DAS, similar to conventional systems, transmitters and receivers are disposed in distributed points to provide a mobile communication service, but a unique cell ID is not owned in each transmission point and instead, one cell ID is shared by a plurality of transmission points.

Figures 4, 5:
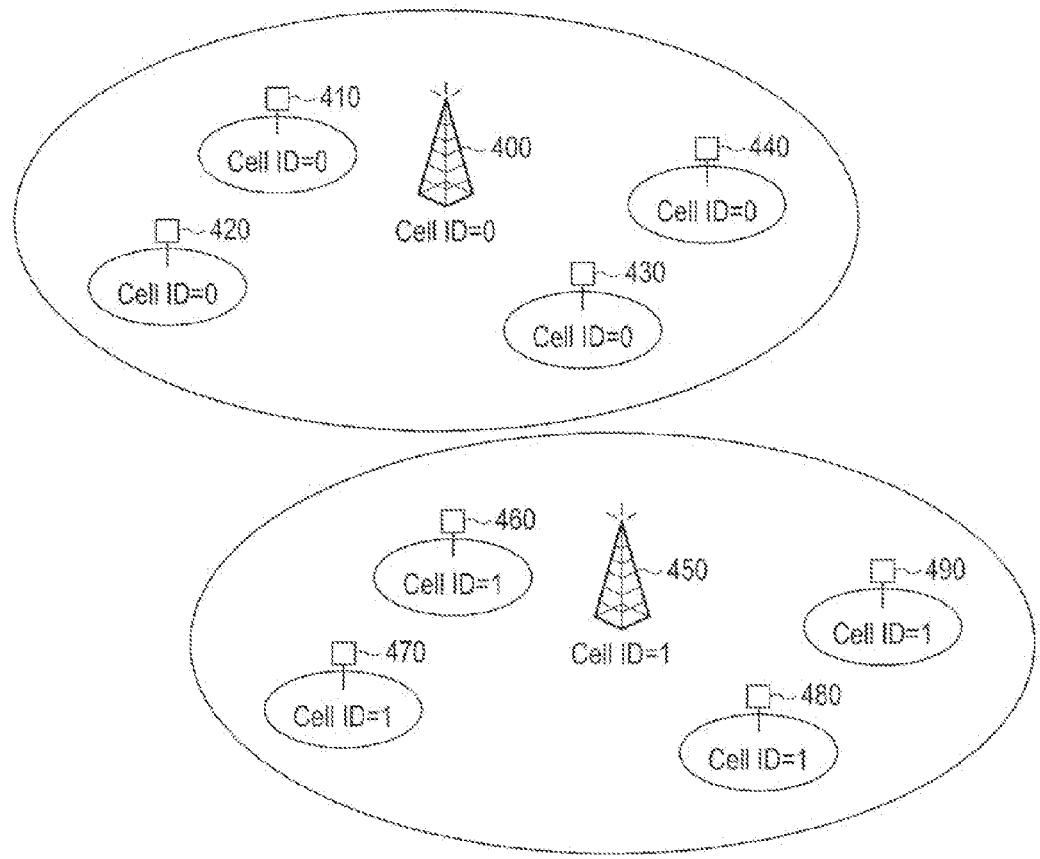
FIG. 4 illustrates a plurality of transmission points in a DAS.
FIG. 5 illustrates Downlink Control Information (DCI) transmitted via a Physical Downlink Control CHannel (PDCCH) according to an embodiment of the present invention.

FIG. 4 illustrates the plurality of transmission points forming the DAS. In FIG. 4, a transmission point 400 which performs transmission with high transmit power and transmission points 410, 420, 430, and 440 which perform transmission with low transmit power all share one cell ID. As such, with respect to the DAS where one cell ID is shared by the plurality of transmission points, allocation of wireless resources of the plurality of transmission points to one UE can be efficiently performed when compared to the conventional mobile communication as shown in FIG. 1.

With respect to the DAS as shown in FIG. 4, the plurality of transmission points share one cell ID, such that when PDSCH DMRS scrambling defined in the current LTE-A system is used, all transmission points use a scrambling sequence generated based on the same initial state, failing to achieve effective interference randomization. That is, in FIG. 4, PDSCH DMRSs transmitted by transmission points for which cell IDs are set to 0 may mutually obtain effective interference randomization effects with PDSCH DMRSs transmitted by transmission points whose cell IDs are set to 1, but the same effect cannot be obtained between transmission points having the same cell ID.

Therefore, the present invention discloses a method for properly allocating an initial state necessary for generation of a scrambling sequence of a PDSCH DMRS to achieve effective interference randomization in a DAS where there are a plurality of transmission points sharing the same cell ID.

As mentioned previously, a conventional technique of a DAS, for a PDSCH DMRS transmitted in a downlink, an initial state of a scrambling sequence is determined according to a cell ID, such that interference randomization effects cannot be obtained between transmission points having the same cell ID. To solve this problem, it is necessary to set an initial state of a different scrambling sequence for a different transmission point in the same cell. In the present invention, some important conditions for applying a new initial state of the scrambling sequence will be provided, as follows.

Condition 1: in a DAS, each transmission point has to be capable of using a scrambling sequence based on a new initial state.

Condition 2: in a DAS, each transmission point has to be capable of using a scrambling sequence based on a legacy initial state as well as a new initial state.

Condition 3: according to a determination of a network, dynamic change has to be possible between a legacy initial state and a new initial state.

Condition 1 is necessary for effectively performing interference randomization in transmission to UEs supporting the DAS. Condition 2 is necessary for Multi-User MIMO (MU-MIMO), which performs transmission in the same time and frequency resource to a UE that does not support the DAS and a UE that supports the DAS. A legacy UE that does not support the DAS cannot support a scrambling sequence based on a new initial state disclosed in the present invention. To simultaneously perform MU-MIMO transmission to the legacy UE and the UE supporting the new initial state in the same time and frequency resource by using multiple antennas, a PDSCH DMRS has to be transmitted using a scrambling sequence based on a legacy initial state, even if interference randomization is not successfully achieved.

Condition 3 is important because transmission may be performed for a UE that supports the DAS, or transmission may be performed for both the UE supporting the DAS and a UE supporting only a conventional technique in each transmission point according to a scheduler's determination. That is, in a particular time period, a DMRS is scrambled using a scrambling sequence based on a new initial state when transmission is made to a UE supporting the scrambling sequence based on the new initial state. However, in another time period, a PDSCH DMRS is scrambled using a scrambling sequence based on a legacy initial state for a legacy UE which does not support the DAS. Similar to when each transmission point supports a scrambling sequence based on a legacy initial state and a scrambling sequence based on a new initial state, the UE supporting the DAS has to support both of the two scrambling sequences.

To exploit the scrambling sequence based on the new initial state, the initial state needs to be determined in a manner shared between the UE and the eNB. In the present invention, as a method for determining a new initial state, a plurality of methods applicable to the LTE-A system will be disclosed below. Hereinafter, Methods 1 through 6 for determining a new initial state for aPDSCH DMRS will be disclosed.

Method 1: Method for Determining Initial State According to Position of CSI-RS Port 15 and Number of CSI-RS Ports A CSI-RS is a reference signal used for a UE to measure a channel of a downlink in the LTE-A. In the LTE-A system, the CSI-RS corresponds to ports through 22. Table 1 shows a position of a CSI-RS port 15 and the number of CSI-RS ports which are possible in the LTE-A system. That is, Table 1 shows a position of the CSI-RS port 15 with respect to the number of CSI-RS ports of a normal cyclic prefix subframe of the LTE-A system.

TABLE 1

| | Port 15 Position | |
|---|---|---|
| 1 port CSI-RS 2 port CSI-RS | 4 port CSI-RS | 8 port CSI-RS |
| 200 of FIG. 2 | 200 of FIG. 2 | 200 of FIG. 2 |
| 201 of FIG. 2 | 201 of FIG. 2 | 201 of FIG. 2 |
| 202 of FIG. 2 | 204 of FIG. 2 | 204 of FIG. 2 |
| 203 of FIG. 2 | 205 of FIG. 2 | 206 of FIG. 2 |
| 204 of FIG. 2 | 206 of FIG. 2 | 216 of FIG. 2 |
| 205 of FIG. 2 | 207 of FIG. 2 | |
| 206 of FIG. 2 | 208 of FIG. 2 | |
| 207 of FIG. 2 | 209 of FIG. 2 | |
| 208 of FIG. 2 | 216 of FIG. 2 | |
| 209 of FIG. 2 | 217 of FIG. 2 | |
| 210 of FIG. 2 | | |
| 211 of FIG. 2 | | |
| 212 of FIG. 2 | | |
| 213 of FIG. 2 | | |
| 214 of FIG. 2 | | |
| 215 of FIG. 2 | | |
| 216 of FIG. 2 | | |
| 217 of FIG. 2 | | |
| 218 of FIG. 2 | | |
| 219 of FIG. 2 | | |

It can be deduced from Table 1 that when the CSI-RS has 1, 2, 4, and 8 as the number of ports, 20, 20, 10, and 5 port 15 positions are possible, respectively. Generally, transmission points located in a short range transmit the CSI-RS in different positions, in order to avoid interference. As such, by using a feature that the CSI-RS of different positions is set in the transmission points in a short range, the initial state of the scrambling sequence for the PDSCH DMRS in the DAS can be determined in Equations (2)-(5), as follows.

When a 1 port CSI-RS is set:

$$C_{init}=(\lfloor n_s/2 \rfloor+1)\cdot(2N_{ID}^{cell}+1)\cdot 2^{16}+n_{SCID}+2^N\cdot i \ (i=0,\ldots,19) \quad (2)$$

When a 2 port CSI-RS is set:

$$C_{init}=(\lfloor n_s/2 \rfloor+1)\cdot(2N_{ID}^{cell}+1)\cdot 2^{16}+n_{SCID}+2^{N+5}\cdot i \ (i=0,\ldots,19) \quad (3)$$

When a 4 port CSI-RS is set:

$$C_{init}=(\lfloor n_s/2 \rfloor+1)\cdot(2N_{ID}^{cell}+1)\cdot 2^{16}+n_{SCID}+2^{N+10}\cdot i \ (i=0,\ldots,9) \quad (4)$$

When a 8 port CSI-RS is set:

$$C_{init}=(\lfloor n_s/2 \rfloor+1)\cdot(2N_{ID}^{cell}+1)\cdot 2^{16}+n_{SCID}+2^{N+14}\cdot i \ (i=0,\ldots,4) \quad (5),$$

wherein the 1 port CSI-RS and the 2 port CSI-RS have the same number of CSI-RS ports. In this case, the same initial state is set, instead of separate initial states.

Another method for determining a new initial state according to the position of the CSI-RS port 15 and the number of CSI-RS ports is to use Equation (6) given below.

$$C_{init}=(\lfloor n_s/2 \rfloor+1)\cdot(2N_{ID}^{cell}+1)\cdot 2^{16}+n_{SCID}+2^N\cdot i \quad (6),$$

wherein i has a value provided as in Table 2 according to the number of CSI-RS ports. Table 2 shows i according to the number of CSI-RS ports in Equation (6).

TABLE 2

| 1 port CSI-RS | i = 0, 1, 2, . . . , 19 (200, 201, 202, 203, 204, 205, 206, 207, 208, 209, 210, 211, 212, 213, 214, 215, 216, 217, 218, and 219 of FIGS. 2) |
|---|---|
| 2 port CSI-RS | i = 20, 21, 22, . . . , 39 (200, 201, 202, 203, 204, 205, 206, 207, 208, 209, 210, 211, 212, 213, 214, 215, 216, |

TABLE 2-continued

| 4 port CSI-RS | 217, 218, and 219 of FIGS. 3) i = 40, 41, 42, . . . , 49 (200, 201, 204, 205, 206, 207, 208, 209, 216, and 217 of FIG. 4) |
|---|---|
| 8 port CSI-RS | i = 50, 51, 52, . . . , 54 (200, 201, 204, 206, and 216 of FIG. 5) |

A method for setting an initial state of a new scrambling sequence for a PDSCH DMRS based on Equation (6) is to determine an initial state by comprehensively considering the possible number and positions of CSI-RS ports. This method, when compared to Equations (2)-(5), is advantageous in that fewer bits of an initial state are changed. The method for determining an initial state for a PDSCH DMRS based on Equation (6) may also set the same initial state, rather than separate initial states, for the 1 port CSI-RS and the 2 port CSI-RS, as in Equations (2)-(5).

Method 2: Method for Determining Initial State According to Position of CSI-RS Port 15

According to a position of a CSI-RS port 15, an initial state of a new scrambling sequence for a PDSCH DMRS may be determined in Equation (7), as follows:

$$C_{init}=(\lfloor n_s/2 \rfloor+1)\cdot(2N_{ID}^{cell}+1)\cdot 2^{16}+n_{SCID}+2^N\cdot i \ (i=0,\ldots,19) \quad (7)$$

wherein the i value may be determined according to a position of a CSI-RS port 15 possible in the LTE-A system as shown in Table 3.

TABLE 3

| Position | i value |
|---|---|
| 200 of FIG. 2 | 0 |
| 201 of FIG. 2 | 1 |
| 202 of FIG. 2 | 2 |
| 203 of FIG. 2 | 3 |
| 204 of FIG. 2 | 4 |
| 205 of FIG. 2 | 5 |
| 206 of FIG. 2 | 6 |
| 207 of FIG. 2 | 7 |
| 208 of FIG. 2 | 8 |
| 209 of FIG. 2 | 9 |
| 210 of FIG. 2 | 10 |
| 211 of FIG. 2 | 11 |
| 212 of FIG. 2 | 12 |
| 213 of FIG. 2 | 13 |
| 214 of FIG. 2 | 14 |
| 215 of FIG. 2 | 15 |
| 216 of FIG. 2 | 16 |
| 217 of FIG. 2 | 17 |
| 218 of FIG. 2 | 18 |
| 219 of FIG. 2 | 19 |

Method 3: Method for Determining Initial State According to 8 Port CSI-RS Pattern Including Transmission CSI-RS Pattern In the LTE-A system, all of 1 port CSI-RS, 2 port CSI-RS, and 4 port CSI-RS are sub-patterns of an 8 port CSI-RS, as shown in FIG. 3. That is, transmission positions of 1 port CSI-RS, 2 port CSI-RS, and 4 port CSI-RS are included in a transmission position of a particular 8 port CSI-RS. By using this feature, an initial state of a new scrambling sequence for a PDSCH DMRS may be determined based on a sub-pattern of which the corresponding CSI-RS is the 8 port CSI-RS. Table 4 shows an i value according to in which 8 port CSI-RS the corresponding CSI-RS is included, and which is based on the following Equation (8):

$$C_{init}=(\lfloor n_s/2 \rfloor+1)\cdot(2N_{ID}^{cell}+1)\cdot 2^{16}+n_{SCID}+2^N\cdot i \ (i=0,\ldots,4) \quad (8)$$

TABLE 4

| 1 port CSI-RS | 2 port CSI-RS | 4 port CSI-RS | 8 port CSI-RS | i value |
|---|---|---|---|---|
| 300 of FIG. 3 | 300 of FIG. 3 | 320 of FIG. 3 | 330 of FIG. 3 | 0 |
| 301 of FIG. 3 | 301 of FIG. 3 | | | |
| 302 of FIG. 3 | 302 of FIG. 3 | 321 of FIG. 3 | | |
| 303 of FIG. 3 | 303 of FIG. 3 | | | |
| 304 of FIG. 3 | 304 of FIG. 3 | 322 of FIG. 3 | 331 of FIG. 3 | 1 |
| 305 of FIG. 3 | 305 of FIG. 3 | | | |
| 306 of FIG. 3 | 306 of FIG. 3 | 323 of FIG. 3 | | |
| 307 of FIG. 3 | 307 of FIG. 3 | | | |
| 308 of FIG. 3 | 308 of FIG. 3 | 324 of FIG. 3 | 332 of FIG. 3 | 2 |
| 309 of FIG. 3 | 309 of FIG. 3 | | | |
| 310 of FIG. 3 | 310 of FIG. 3 | 325 of FIG. 3 | | |
| 311 of FIG. 3 | 311 of FIG. 3 | | | |
| 312 of FIG. 3 | 312 of FIG. 3 | 326 of FIG. 3 | 333 of FIG. 3 | 3 |
| 313 of FIG. 3 | 313 of FIG. 3 | | | |
| 314 of FIG. 3 | 314 of FIG. 3 | 327 of FIG. 3 | | |
| 315 of FIG. 3 | 315 of FIG. 3 | | | |
| 316 of FIG. 3 | 316 of FIG. 3 | 328 of FIG. 3 | 334 of FIG. 3 | 4 |
| 317 of FIG. 3 | 317 of FIG. 3 | | | |
| 318 of FIG. 3 | 318 of FIG. 3 | 329 of FIG. 3 | | |
| 319 of FIG. 3 | 319 of FIG. 3 | | | |

When an initial state of a new scrambling sequence for a PDSCH DMRS is determined according to Equation (8) and Table 4, all CSI-RSs included in the same 8 port CSI-RS have the same initial state.

Method 4: Method for Determining Initial State According to Relative Position in 8 Port CSI-RS Pattern Including Transmission CSI-RS Pattern As shown in FIG. 3, a CSI-RS of the LTE-A system is designed to have a specific rule. For example, the transmission position 300 of FIG. 3 for transmission of a 2 port CSI-RS and the transmission position 304 of FIG. 3 for transmission of another 2 port CSI-RS have the same relative position with respect to 8 port CSI-RSs including the respective 2 port CSI-RSs. That is, the relative position of the transmission position 300 of FIG. 3 with respect to the transmission position 330 of the 8 port CSI-RS and the relative position of the transmission position 304 of FIG. 3 with respect to the transmission position 331 of the 8 port CSI-RS are the same. An initial state of a new scrambling sequence for a PDSCH DMRS may be determined using the relative position with respect to an 8 port CSI-RS, as shown below In Table 5, which shows the i value with respect to a relative transmission position in a port CSI-RS transmission position, and is based on the following Equation (9).

$$C_{init}=(\lfloor n_s/2 \rfloor+1)\cdot(2N_{ID}^{cell}+1)\cdot 2^{16}+n_{SCID}+2^N\cdot i \ (i=0,\ldots,10) \quad (9)$$

TABLE 5

| Number of CSI-RS Ports | Transmission Position | i value |
|---|---|---|
| 1 port CSI-RS | 300, 304, 306, 308, and 316 of FIG. 3 | 0 |
| | 301, 305, 307, 309, and 317 of FIG. 3 | 1 |
| | 302, 310, 312, 314, and 318 of FIG. 3 | 2 |
| | 303, 311, 313, 315, and 319 of FIG. 3 | 3 |
| 2 port CSI-RS | 300, 304, 306, 308, and 316 of FIG. 3 | 4 |
| | 301, 305, 307, 309, and 317 of FIG. 3 | 5 |
| | 302, 310, 312, 314, and 318 of FIG. 3 | 6 |
| | 303, 311, 313, 315, and 319 of FIG. 3 | 7 |
| 4 port CSI-RS | 320, 322, 324, 326, and 328 of FIG. 3 | 8 |
| | 321, 323, 325, 327, and 329 of FIG. 3 | 9 |
| 8 port CSI-RS | 330, 331, 332, 333, and 334 of FIG. 3 | 10 |

In the foregoing method, the i value is set also considering the number of CSI-RS ports. An initial state of a new scrambling sequence for a PDSCH DMRS may also be determined considering only a relative position of a CSI-RS port 15, as shown below in Table 6, which shows the i value according to a relative transmission position of a port 15 in a port CSI-RS transmission position, and is based on the following Equation (10).

$$C_{init}=(\lfloor n_s/2 \rfloor+1)\cdot(2N_{ID}^{cell}+1)\cdot 2^{16}+n_{SCID}+2^N\cdot i \ (i=0,\ldots,3) \quad (10)$$

The $N_{ID}^{cell}$ represents a Physical layer cell identity, $n_{SCID}$ indicates the number of the Scrambling Code Identification, the i value is set as the number of CSI-RS ports, and $n_s$ represents a Slot number within a radio frame.

TABLE 6

| | Transmission Position | i value |
|---|---|---|
| 1 port CSI-RS | 300, 304, 306, 308, and 316 of FIG. 3 | 0 |
| | 301, 305, 307, 309, and 317 of FIG. 3 | 1 |
| | 302, 310, 312, 314, and 318 of FIG. 3 | 2 |
| | 303, 311, 313, 315, and 319 of FIG. 3 | 3 |
| 2 port CSI-RS | 300, 304, 306, 308, and 316 of FIG. 3 | 0 |
| | 301, 305, 307, 309, and 317 of FIG. 3 | 1 |
| | 302, 310, 312, 314, and 318 of FIG. 3 | 2 |
| | 303, 311, 313, 315, and 319 of FIG. 3 | 3 |
| 4 port CSI-RS | 320, 322, 324, 326, and 328 of FIG. 3 | 0 |
| | 321, 323, 325, 327, and 329 of FIG. 3 | 1 |
| 8 port CSI-RS | 330, 331, 332, 333, and 334 of FIG. 3 | 0 |

When an initial state of a scrambling sequence for a PDSCH DMRS according to CSI-RS configuration is determined as in Methods 1-4, if a plurality of CSI-RSs are set, the determination can be made according to a plurality of initial states.

Method 5: Method for Determining Initial State According to High-Level Signaling In Methods 1-4, a new initial state of a scrambling sequence for a PDSCH DMRS is set according to setting of a CSI-RS. Such methods achieve the goal without additional signaling between an eNB and a UE, but are executed according to a rule and thus are difficult to optimize according to circumstances. To overcome such a drawback, the eNB may notify the UE of which initial state will be used, through separate high-level signaling. In this case, the eNB may notify the UE of all or a portion of information corresponding to an initial state. Generally, since a portion of the initial state is previously determined, a value may be used without an additional notification and only the remaining portion may be notified to the UE by the eNB. For example, let a new initial state of a scrambling sequence for a PDSCH DMRS be determined as provided in Equation (11) below.

$$C_{init} = (\lfloor n_s/2 \rfloor + 1) \cdot (2N_{ID}^{cell}+1) \cdot 2^{16} + n_{SCID} + 2^N \cdot i \ (i=0, \ldots, K-1) \quad (11)$$

wherein $(\lfloor n_s/2 \rfloor + 1) \cdot (2N_{ID}^{cell}+1) \cdot 2^{16} + n_{SCID}$ may be determined by a separate process. Consequently, the eNB may notify the UE of only i in Equation (11) for initial state determination using high-level signaling disclosed in the present invention. As in Equation (11), when i is in a range of 0 to K−1, then the initial state may be information which can be expressed by a total of $\lceil \log_2 K \rceil$ bits.

An initial state may be determined using Equation (12) as well as Equation (11) of Method 5.

$$C_{init} = (\lfloor n_s/2 \rfloor + 1) \cdot (2X+1) \cdot 2^{16} + n_{SCID} + 2^N \cdot i \ (i=0, \ldots, K-1) \quad (12)$$

It can be seen that in Equation (12), when compared to Equation (11), $N_{ID}^{cell}$ is substituted by X. In Equation (12), X has an information amount of 9 bits and is notified to a UE using high-level signaling. In the legacy LTE/LTE-A system, $N_{ID}^{cell}$ of an initial state for a DMRS is a value determined by the UE that receives a synchronization channel for a Primary Synchronization Signal (PSS) and a Secondary Synchronization Signal (SSS) without separate high-level signaling. Equation (12) disclosed in the present invention determines an initial state based on X and i notified by the eNB to the UE through high-level signaling, instead of $N_{ID}^{cell}$ determined using the PSS and the SSS. When using this method, selection from among more initial states than in Equation (11) is possible.

In addition to the method for determining an initial state based on X and i as in Equation (12), the initial state may also be determined using only X. This is the same as when i is fixed to '0' at all times. This method allows reuse of initial states for a DMRS defined in the legacy LTE/LTE-A, reducing implementation complexity. In this manner, when an initial state is determined using only X, the eNB notifies the UE of which initial state is to be used through high-level signaling with X.

Method 6: Method for Determining Initial State According to RNTI of UE

Method 5 determines a new initial state by using separate high-level signaling. When using Method 5, additional overhead is inevitable due to high-level signaling. One way to avoid the overhead is determining an initial state by using a Radio Network Temporary Identifier (RNTI) owned by each UE. The RNTI is used to identify a UE, and is transmitted in a network when the UE is connected to the LTE/LTE-A system, regardless of whether the UE performs Coordinated Multipoint Transmission (CoMP) transmission and reception. By using a basically provided RNTI, additional high-level signaling as in Method 5 is not necessary. To determine a new initial state by using an RNTI, the following Equation (13) or Equation (14) may be used.

$$C_{init} = (\lfloor n_s/2 \rfloor + 1) \cdot (2N_{ID}^{cell}+1) \cdot 2^{16} + n_{SCID} + 2^N \cdot RNTI \quad (13)$$

$$C_{init} = (\lfloor n_s/2 \rfloor + 1) \cdot (2N_{ID}^{cell}+1) \cdot 2^{16} + n_{SCID} + 2^N \cdot RNTI \bmod G \quad (13)$$

In Equation (14), G is an integer greater than 1.

Methods 1-6 are for determining an initial state of a new scrambling sequence for a PDSCH DMRS. As mentioned previously, there are several conditions to be satisfied when a PDSCH DMRS is scrambled for each transmission point in a DAS. Methods 1-5 determine a new initial state that satisfies Condition 1. In addition, scrambling of a PDSCH DMRS needs to use a scrambling sequence generated by a legacy initial state and a scrambling sequence generated by a new initial state determined by Methods 1-6 properly according to circumstances. That is, the legacy initial state and the new initial state need to vary with scheduling determination for each subframe.

For this function, the present invention discloses a method for notifying which initial state is used to scramble a DMRS via a PDCCH of the LTE system. To this end, information 'CoMP Scrambling Index' is newly added to the PDCCH and is transmitted for notification each time the eNB allocates a downlink radio resource to the UE. The information 'CoMP Scrambling Index' may be transmitted via the PDCCH, but it may also be notified in the same manner by using an Enhanced PDCCH (E-PDCCH), which is an improved channel of the PDCCH.

Table 7 relates to a first embodiment for notifying which initial state is to be used to scramble a PDSCH DMRS via a PDCCH.

TABLE 7

| CoMP Scrambling Index | Initial State for DMRS Scrambling |
| --- | --- |
| 00 | Legacy initial state |
| 01 | New initial state1 |
| 10 | New initial state2 |
| 11 | New initial state3 |

Table 7 shows a plurality of new initial states, since cooperative transmission using a plurality of transmission points is possible in a DAS. When cooperative transmission is used, according to a determination of a central controller, for every subframe, the UE may receive downlink transmission in any one of the plurality of transmission points and may receive downlink transmission in the plurality of transmission points according to circumstances.

In Table 7, legacy and new initial states may have the same cell ID, but may also have different cell IDs to allow cooperative transmission between transmission points having the same cell ID and transmission points of neighboring cells in the DAS.

In Table 7, new initial states are determined using one of Methods 1-6 disclosed in the present invention, prior to notification via a PDCCH. In Methods 1-4, an initial state is determined according to a CSI-RS set to the UE, and in Method 5, an initial state is determined by separate high-level signaling. In Method 6, an initial state is determined by an RNTI of the UE.

Table 8 relates to a second embodiment for notifying which initial state is to be used to scramble a PDSCH DMRS via a PDCCH.

TABLE 8

| CoMP Scrambling Index | Initial State for DMRS Scrambling |
|---|---|
| 00 | Legacy initial state1 |
| 01 | Legacy initial state2 |
| 10 | New initial state1 |
| 11 | New initial state2 |

In Table 8, there are a plurality of legacy initial states and a plurality of new initial states. Since cooperative transmission using a plurality of transmission points is possible in a DAS, the plurality of new initial states exists, as well as to allow cooperative transmission between neighboring cells that are not established in a distributed antenna form. In Table 7 and Table 8, the plurality of initial states may include at least one legacy initial state. The present invention allows the UE to simultaneously use the new initial states and the legacy initial states. In the same manner, only the new initial states may be used. In Table 7 and Table 8, all of the legacy initial states are substituted by the new initial states or are removed.

Initial state notification for a scrambling sequence of a PDSCH DMRS via a PDCCH disclosed in the present invention may be performed using 2 bits as in the foregoing embodiment. By using additional bits, additional initial states may also be notified. By using 1 bit, which one of a legacy initial state and a new initial state is to be used may be notified. In the foregoing description, a legacy initial state may be implicitly determined according to a cell ID of a serving cell to which the UE is connected, without separate high-level signaling. In the above-described manner, the initial state may also be determined using separate high-level signaling.

Another method for notifying a UE of which initial state is to be used is using a combination of the CoMP Scrambling Index and a Scrambling Code Identification (SCID) defined in the legacy LTE-A system. Table 9 relates to a third embodiment for notifying which initial state is to be used for scrambling a PDSCH DMRS via a PDCCH.

TABLE 9

| CoMP Scrambling Index | SCID | Initial State for DMRS Scrambling |
|---|---|---|
| 0 | 0 | Legacy initial state |
| 0 | 1 | New initial state1 |
| 1 | 0 | New initial state2 |
| 1 | 1 | New initial state3 |

An SCID defined in the legacy LTE-A determines only a Least Significant Bit (LSB) of an initial state of scrambling for a DMRS. However, when using a method disclosed in the present invention, the SCID may be combined with the CoMP Scrambling Index to determine other bits as well as the LSB of the initial state of scrambling for the DMRS. That is, in Table 9, the CoMP Scrambling Index and the SCID determine one of a plurality of initial states determined by Methods 1-6, rather than the legacy SCID determines only 1-bit LSB of the initial state. The plurality of initial states determined by the foregoing methods may differ in a plurality of bits. That is, when the CoMP Scrambling Index and the SCID of Table 9 are used together, the SCID does not determine the LSB of 1 bit as in the conventional technique. Methods 1-6 are used to determine which initial state the combined information of the CoMP Scrambling Index and the SCID designates.

Table 10 relates to a fourth embodiment for notifying which initial state is to be used to scramble a PDSCH DMRS via a PDCCH.

TABLE 10

| CoMP Scrambling Index | SCID | Initial State for DMRS Scrambling |
|---|---|---|
| 00 | 0 | Legacy initial state1 |
| 00 | 1 | Legacy initial state2 |
| 01 | 0 | New initial state1 |
| 01 | 1 | New initial state2 |
| 10 | 0 | New initial state3 |
| 10 | 1 | New initial state4 |
| 11 | 0 | New initial state5 |
| 11 | 1 | New initial state6 |

In the LTE-A, the SCID has an information amount of 1 bit, but is transmitted after being combined with DMRS port allocation information. In this case, only when the number of allocated DMRS ports is 1 or 2, the SCID may be '0' or '1', and when the number of allocated DMRS ports is 3 or more, the SCID is fixed to '0'. When a combination of the CoMP Scrambling Index and the SCID is used as in Table 9 and Table 10, an initial state of a scrambling sequence for a DMRS may be different initial states, and may be allocated even if 3 or more DMRS ports are allocated, unlike in a conventional technique.

By allocating different initial states even when three or more DMRS ports are allocated, interference randomization between transmission points is possible in the DAS. That is, when using only the SCID, if three or more DMRS ports are allocated, the SCID always has a value of '0', such that a fixed initial state is used. However, when using the CoMP Scrambling Index disclosed in the present invention together with the SCID as in Table 9 and Table 10, different initial states can be allocated even if the SCID is '0'. Such an advantage is also applied to the method disclosed in Table 7 and Table 8.

FIG. 5 illustrates DCI transmitted via a PDCCH according to the present invention.

In FIG. 5, CoMP Scrambling Index 500 disclosed in the present invention is transmitted, together with SCID 500 and other DCI-related information 520, via a PDCCH. By using CoMP Scrambling Index 500, the UE may identify an initial state, based on which a scrambling sequence is generated and used, as described above. In FIG. 5, SCID 510 is 1-bit information and is defined in a legacy LTE/LTE-A system to allow MU-MIMO in one transmission point. This value is included in Equations (1) through (10). In addition to transmission of SCID 510 as 1-bit information, SCID 510 may also be combined with DMRS port allocation information for transmission. That is, the UE may determine a new initial state using one of Methods 1-6 before receiving CoMP Scrambling Index 500 and SCID 510 of FIG. 5. Thereafter, the UE receives information of FIG. 5 from the eNB via a PDCCH and thus is notified which initial state is used to scrambling the DMRS.

Figure 6:
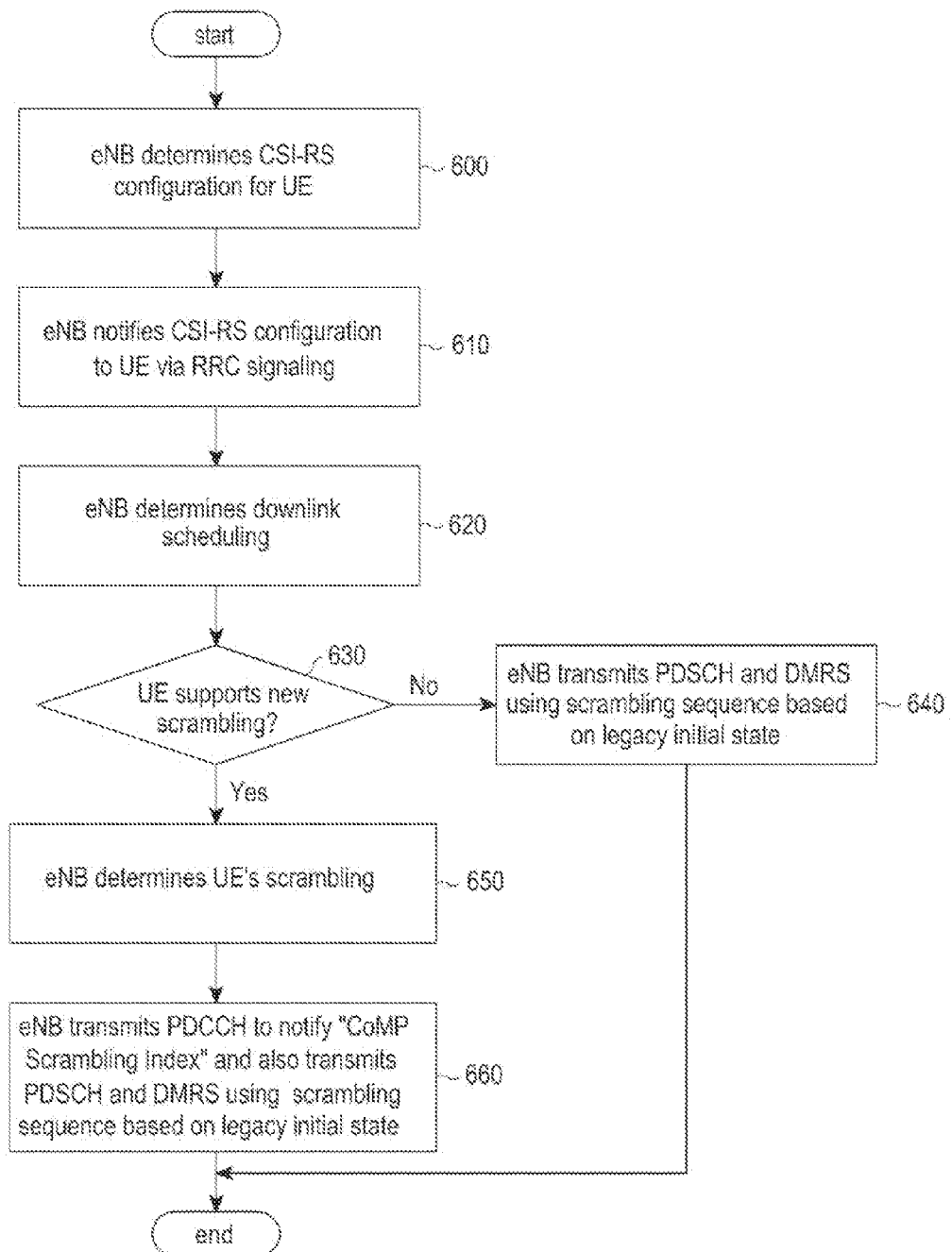
FIG. 6 illustrates an operation of a BS according to an embodiment of the present invention.

FIG. 6 illustrates a process in which an initial state of a new scrambling sequence for a PDSCH DMRS is determined and the eNB notifies the UE of an initial state, based on which a scrambling sequence is generated and used to scramble the transmitted PDSCH DMRS, according to the present invention.

In FIG. 6, the eNB determines how to set CSI-RS configuration related to a DAS in step 600. The eNB notifies the UE of the UE's CSI-RS configuration determined in step 600 through high-level signaling, in step 610. After the UE's CSI-RS configuration is notified, the eNB performs scheduling for determining to which UE downlink resources are to be assigned, in step 620. The eNB, after determining to which UE a PDSCH is to be transmitted in step 620, performs a corresponding operation according to whether the UE is a UE which supports a new initial state for DMRS scrambling, in step 630. If it is determined that the UE does not support the new initial state for PDSCH DMRS scrambling in step 630, the eNB transmits a PDSCH DMRS scrambled by a scrambling sequence based on a legacy initial state in step 640. If the UE does not support the new initial state as in step 640, CoMP Scrambling Index disclosed in the present invention is not transmitted, either.

However, if it is determined that the UE supports a new initial state in step 630, the eNB determines which initial state is to be used to generate a scrambling sequence to the UE in step 650. In step 650, the initial state to be applied to the UE may be one of a legacy initial state and a new initial state as in Table 7 or Table 8. The initial state determined in step 650 is notified to the UE via a PDCCH or an E-PDCCH, which is an enhanced channel of the PDCCH in step 660. The eNB transmits the PDSCH and the PDSCH DMRS to the UE, together with the PDCCH.

In FIG. 6, it is assumed that a new initial state is determined by CSI-RS configuration. That is, it is assumed that one of Methods 1-4 is used. A similar process is also applied when Method 5 and Method 6 are used, such that the eNB may notify the UE which initial state is used.

Figure 7:
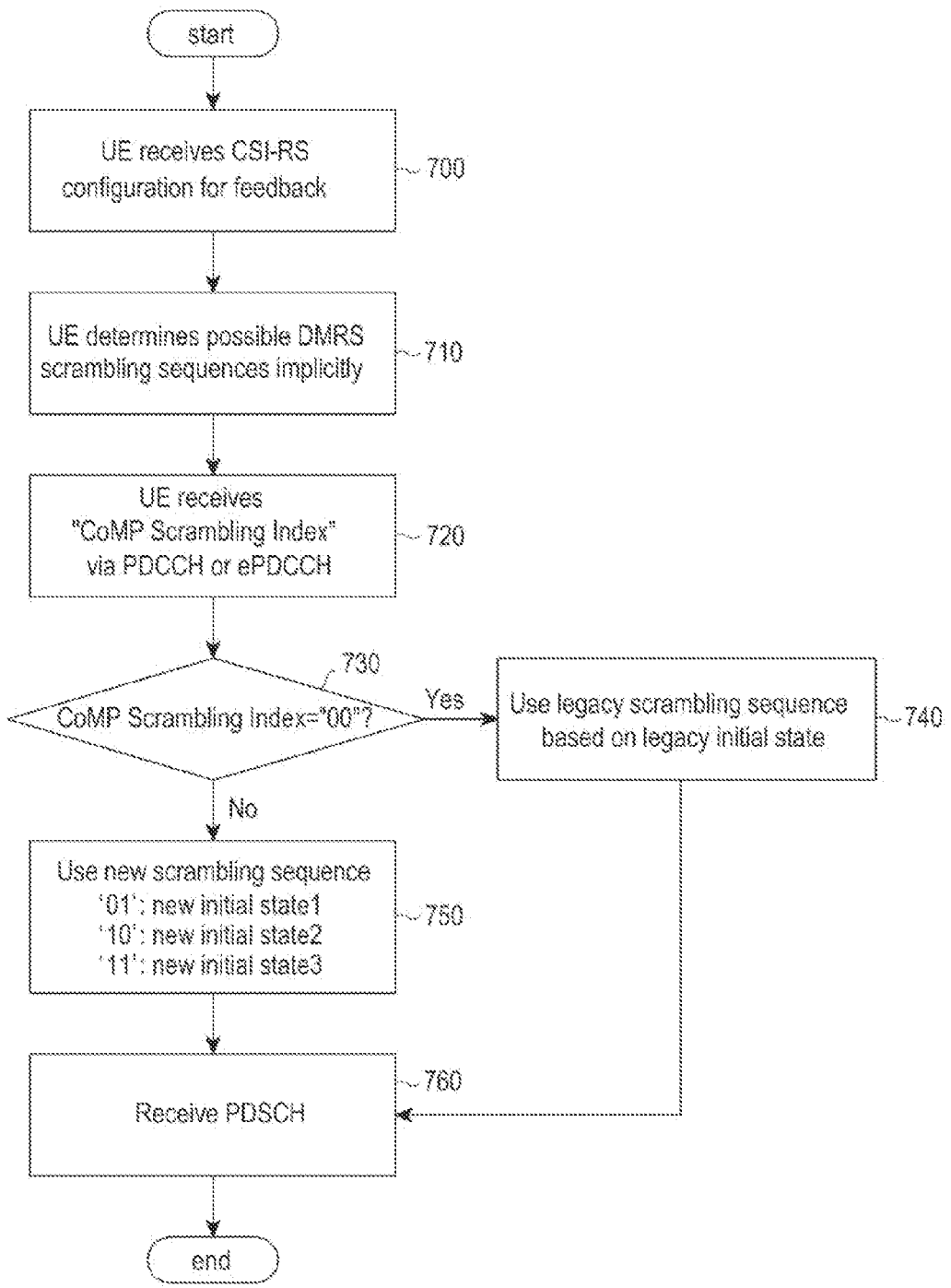
FIG. 7 illustrates an operation of a UE according to an embodiment of the present invention.

FIG. 7 illustrates a process in which an initial state of a new scrambling sequence for a PDSCH DMRS is determined and the UE determines which initial state has been applied to a PDSCH DMRS transmitted from the eNB, according to the present invention.

In step 700 of FIG. 7, the UE is notified of CSI-RS configuration related to a DAS from the eNB. By using the CSI-RS configuration notified in step 700, the UE identifies an initial state of a new scrambling sequence for a PDSCH DMRS, in which case one of Methods 1-4 disclosed in the present invention may be used. The initial state of the new scrambling sequence for the PDSCH DMRS may also be notified to the UE by using one of Methods 1-6. Regardless of the CSI-RS configuration of step 700, the eNB may directly notify the UE of which initial state is to be used, through high-level signaling.

After the UE identifies an initial state used for the new scrambling sequence for the PDSCH DMRS in steps 700 and 710 of FIG. 7, the DCI (520) as shown in FIG. 5 is received using a PDCCH or an E-PDCCH which is an enhanced channel of the PDCCH, in step 720. The UE having received the DCI in step 720, using CoMP Scrambling Index 500, identifies an initial state, based on which the used scrambling sequence has been generated. If CoMP Scrambling Index is '00' in step 720, the UE determines that the eNB performs scrambling using a scrambling sequence generated using a legacy initial state when transmitting a PDSCH DMRS of a downlink in step 740 and receives a traffic channel, a PDSCH, in step 760.

However, if CoMP Scrambling Index is not '00' in step 730, the UE determines that scrambling is performed using a scrambling sequence generated by a new initial state, and receives the traffic channel, the PDSCH, in step 760 by using the scrambling sequence in step 750. In FIG. 7, it is assumed that one of Methods 1-4 is used to determine a new initial state according to CSI-RS configuration, and CoMP Scrambling Index has 2-bit information and is defined as in Table 7. Similarly, this process may be applied to Method 5, Method 6, and Table 8.

In FIG. 7, an initial state for scrambling for a DMRS is determined using only a CoMP Scrambling Index. In addition, the use of SCID together with the CoMP Scrambling Index as in Table 8 may also be applied to the same process as in FIG. 7. That is, CoMP Scrambling Index is applied in FIG. 7 together with SCID as in Table 8, CoMP Scrambling Index and SCID are received in step 720 of FIG. 7 and then an initial state is determined using CoMP Scrambling Index and SCID in step 730.

Figure 8:
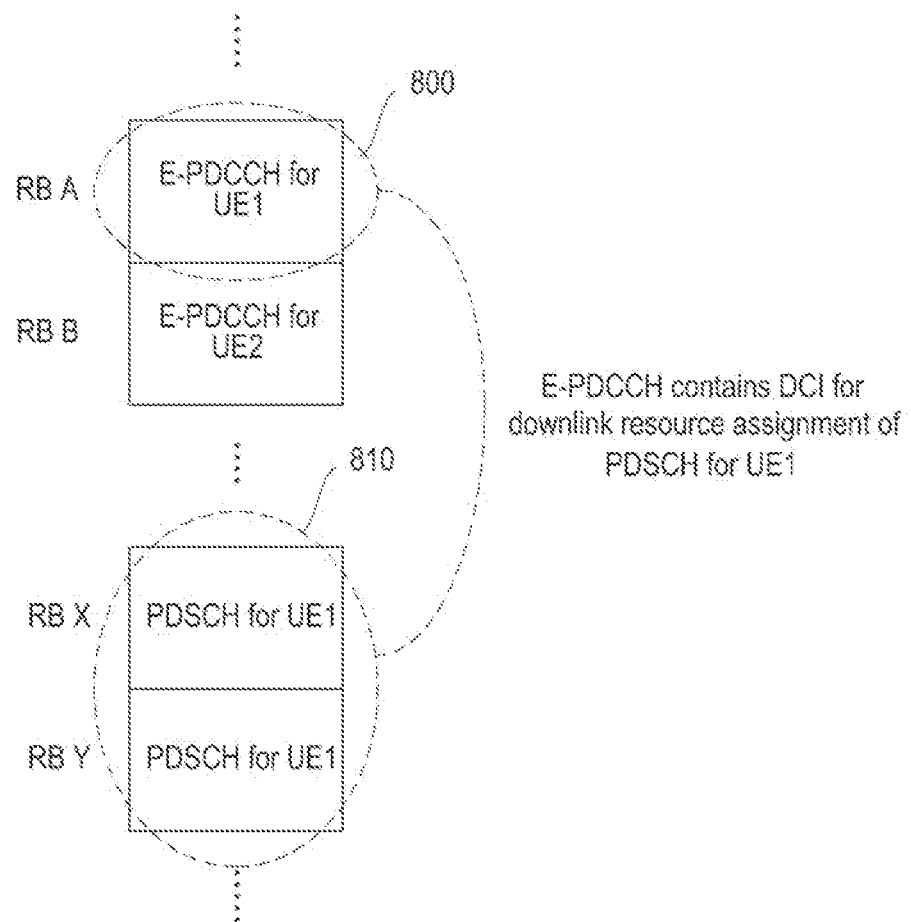
FIG. 8 illustrates a relationship between an Enhanced-PDCCH (E-PDCCH) and a Physical Downlink Shared Channel (PDSCH).

In an LTE-A system supporting a DAS, an E-PDCCH may be supported for efficient transmission of a control channel. FIG. 8 illustrates a relationship between an E-PDCCH and a PDSCH. In FIG. 8, the E-PDCCH is transmitted in a specific portion of a radio resource as indicated by 800. The E-PDCCH in the portion 800 is used to notify the DCI necessary for receiving a PDSCH of a particular UE as indicated by 810 to the UE. The E-PDCCH is an enhanced channel of a PDCCH used as a control channel in a legacy LTE/LTE-A system, and is largely different from the PDCCH in that the E-PDCCH may also be operated based on a DMRS similar to a PDSCH, but the PDCCH always operates based on a CRS.

When the E-PDCCH is used based on a DMRS, it is necessary to define the initial state based on which the PDCCH DMRS uses a scrambling sequence. Generally, the PDSCH DMRS notifies to the UE the E-PDCCH or PDCCH the initial state on which uses a scrambling sequence is generated.

However, with respect to the control channel such as the E-PDCCH, another control channel provides a separate notification. To solve this problem, with respect to the E-PDCCH, one of a plurality of initial states used to generate a scrambling sequence for a PDSCH DMRS is set and used in the present invention. That is, with respect to the E-DPCCH DMRS, a scrambling sequence generated based on a corresponding initial state is always used. The E-PDCCH DMRS uses one of initial states of the PDSCH DMRS. For example, if there are four applicable initial states as in Table 7, the eNB sets one of these states as an initial state for the E-PDCCH.

The E-PDCCH is transmitted together with a DMRS scrambled using a scrambling sequence generated based on a preset dedicated initial state. For this reason, the UE receives the E-PDCCH by using a scrambling sequence based on the initial state for the E-PDCCH notified in initial setting, without being notified of or identifying an initial state, based on which a scrambling sequence is generated and used to scramble the E-PDCCH, for every subframe.

The scrambling initial state of the DMRS for the E-PDCCH (or E-PDCCH DMRS) is set to one of scrambling initial states of the PDSCH DMRS. To set the scrambling initial state of the E-PDCCH DMRS, the eNB may notify the UE, using RRC signaling, which one of scrambling initial states for the PDSCH DMRS is used. The scrambling initial state of the E-PDCCH DMRS may be determined by a pre-agreed method between the UE and the eNB. To do so, a scrambling initial state of a transmission point having the largest reception strength among transmission points in which CS-RS configuration is set may be used. Since the UE may periodically notify the eNB of a reception strength of a reference signal measured for each transmission point, when using the foregoing method, the UE may determine the initial state based on which the E-PDCCH is scrambled and a scrambling sequence is generated, without being separately notified from the eNB.

While not shown in the drawings, a processor (or a controller) capable of performing operations disclosed in the present invention as well as Methods 1 through 6 according to embodiments of the present invention may be provided in a UE and a BS.

According to the present invention, without separate notification from the eNB, the UE can identify an initial state, based on which a scrambling sequence is generated and used to scramble the E-PDCCH.

In addition, the UE and the eNB may achieve interference randomization effects between DMRSs transmitted in transmission points having the same cell ID by using the method for determining the new initial state.

Moreover, a scrambling sequence can be obtained using the method for determining the new initial state.

While the present invention has been particularly shown and described with reference to embodiments thereof, it will be understood by those of ordinary skill in the art that various embodiments or modifications may be made therein without departing from the spirit and scope of the present invention as defined by the following claims. Accordingly, the scope of the present invention should be defined by the claims and equivalents thereof rather than by the described embodiments.

What is claimed is:

1. A method for determining an initial state of a scrambling sequence in a distributed antenna system comprising a plurality of transmission points, the method comprising:
   receiving a value through high-level signalling; and
   determining an initial state of the scrambling sequence related to a reference signal as one of a legacy initial state and a new initial state, based on the value,
   wherein the initial state of the scrambling sequence is determined based on a transmission point that transmits the reference signal,
   wherein the value is related to the plurality of transmission points sharing the same cell identifier, and
   wherein the initial state is determined based on at least two of a position of an antenna port, a number of antenna ports, and an antenna pattern for the antenna port.

2. The method of claim 1, wherein the value comprises 9 bits.

3. The method of claim 1, wherein the initial state of the scrambling sequence is a value previously set through high-level signalling.

4. An apparatus for determining an initial state of a scrambling sequence in a distributed antenna system comprising a plurality of transmission points, the apparatus comprising:
   a receiver configured to receive a value through high-level signalling; and
   a controller configured to determine an initial state of the scrambling sequence related to a reference signal as one of a legacy initial state and a new initial state, based on the value,
   wherein the initial state of the scrambling sequence is determined based on a transmission point that transmits the reference signal,
   wherein the value is related to the plurality of transmission points sharing the same cell identifier, and
   wherein the initial state is determined based on at least two of a position of an antenna port, a number of antenna ports, and an antenna pattern for the antenna port.

5. The apparatus of claim 4, wherein the value comprises 9 bits.

6. The apparatus of claim 4, wherein the initial state of the scrambling sequence is a value previously set through high-level signalling.

* * * * *